United States Patent
Nahas

[19]

[11] Patent Number: 5,987,846
[45] Date of Patent: Nov. 23, 1999

[54] WALLBOARD FASTENING MEMBER AND METHODS OF USING THE SAME

[76] Inventor: Michael Nahas, 2378 Roth Dr., Cuyahoga Falls, Ohio 44221

[21] Appl. No.: 09/007,951

[22] Filed: Jan. 16, 1998

[51] Int. Cl.$^6$ ........................................................ E04C 2/32
[52] U.S. Cl. ............................ 52/733.3; 52/98; 52/459; 52/483.1; 52/731.1; 52/731.9; 52/506.06; 403/389; 403/393
[58] Field of Search .................................. 52/582.1, 698, 52/712, 733.2, 733.3, 98, 459, 481.1, 483.1, 730.7, 731.1, 731.9, 506.06, 733.4, 281, 578; 403/389, 393, 384

[56] References Cited

U.S. PATENT DOCUMENTS

| | | | |
|---|---|---|---|
| 552,939 | 1/1896 | Wahl et al. | 52/98 X |
| 1,078,714 | 11/1913 | Brownstein | 52/712 |
| 1,787,038 | 12/1930 | Geoffray | 52/698 |
| 2,594,928 | 4/1952 | Horowitz | 52/578 X |
| 2,889,016 | 6/1959 | Warren | 52/98 |
| 3,005,293 | 10/1961 | Hunter | 52/712 |
| 3,712,015 | 1/1973 | Nelson . | |
| 3,831,333 | 8/1974 | Nelsson et al. . | |
| 3,854,259 | 12/1974 | Lechene | 52/98 X |
| 3,967,432 | 7/1976 | Starr . | |
| 3,999,343 | 12/1976 | Roberts . | |
| 4,394,808 | 7/1983 | Thorsell . | |
| 4,435,936 | 3/1984 | Rutkowski . | |
| 4,455,794 | 6/1984 | MacKinnon, Jr. et al. | 52/98 |
| 4,596,094 | 6/1986 | Teller et al. . | |
| 4,649,689 | 3/1987 | Everman et al. . | |
| 4,651,484 | 3/1987 | Rutkowski . | |
| 4,674,242 | 6/1987 | Oboler et al. . | |
| 4,713,921 | 12/1987 | Minialoff et al. . | |
| 4,757,663 | 7/1988 | Kuhr . | |
| 4,796,396 | 1/1989 | Menchetti . | |
| 4,837,988 | 6/1989 | Menchetti et al. . | |
| 4,843,784 | 7/1989 | Menchetti et al. . | |
| 4,854,096 | 8/1989 | Smolik . | |
| 4,866,899 | 9/1989 | Houser . | |
| 4,902,179 | 2/1990 | Harker . | |
| 5,060,434 | 10/1991 | Allison . | |
| 5,067,296 | 11/1991 | Brown et al. | 52/733.3 X |
| 5,095,678 | 3/1992 | Murphy . | |
| 5,177,925 | 1/1993 | Winkler et al. . | |
| 5,189,850 | 3/1993 | Felton | 52/36.4 |
| 5,274,973 | 1/1994 | Liang . | |
| 5,325,641 | 7/1994 | Felton . | |
| 5,351,452 | 10/1994 | Gates . | |
| 5,408,796 | 4/1995 | Hashimoto et al. . | |
| 5,426,904 | 6/1995 | Gilmore . | |
| 5,452,556 | 9/1995 | Taylor . | |
| 5,475,961 | 12/1995 | Menchetti . | |
| 5,485,706 | 1/1996 | Menchetti . | |
| 5,515,658 | 5/1996 | Jorde . | |
| 5,706,621 | 1/1998 | Pervan | 52/403.1 |

FOREIGN PATENT DOCUMENTS

| | | | |
|---|---|---|---|
| 259759 | 6/1964 | Australia | 52/98 |
| 678933 | 12/1964 | Italy | 52/350 |
| 259759 | 6/1965 | U.S.S.R. | 52/98 |
| 2260346 | 4/1993 | United Kingdom | 52/582.1 |

*Primary Examiner*—Carl D. Friedman
*Assistant Examiner*—Phi Dieu Tran A
*Attorney, Agent, or Firm*—Oldham & Oldham Co., L.P.A.

[57] ABSTRACT

A wallboard fastening member and methods of using the same which is adapted to be positioned as a wall stud or joist between existing studs or joists present in a walls and ceilings of residential, commercial and industrial structures. The wallboard fastening member in accordance with the present invention is intended to be used where opposing ends of a piece of wallboard, such as gypsum drywall wallboard, are not aligned with an existing stud or joist to avoid the necessity of fitting up or cutting the wallboard and thus creating undesirable scrap. The preferred embodiment of a wallboard fastening member is a generally elongated member and preferably includes a stepped configuration on one side to permit the wallboard fastening member to fasten adjacent pieces of wallboard having different sizes by using the side having a stepped configuration or to fasten adjacent pieces of wallboard of the same size by using the flat side. In addition, if desired, wallboard fastening member can include score lines or perforations to permit the length of wallboard fastening member to be easily and quickly adjusted.

31 Claims, 1 Drawing Sheet

WALLBOARD FASTENING MEMBER AND METHODS OF USING THE SAME

BACKGROUND AND SUMMARY OF THE INVENTION

The present invention relates generally to a new and novel wallboard fastening member and methods of using the same. More particularly, the present invention relates to a new and novel wallboard fastening member which may be utilized to facilitate the installation of wallboard, such as interior gypsum drywall wallboard and exterior sheetrock, such as GYPROCK®, a product manufactured by United States Gypsum in Chicago, Ill., in residential, commercial and industrial structures during both new construction and renovation and methods of using the same.

When installing wallboard, such as gypsum drywall wallboard, in residential, commercial and industrial structures, it is generally desirable to attach or fasten at least two (2) opposing edges of the wallboard to studs or joists present in the walls and/or ceilings of the structure as framed. Attachment of pieces of wallboard to the studs or joists is typically made using mechanical fasteners, such as nails or threaded screws, although adhesives may also be used. Studs or joists present in the walls and/or ceilings of a structure are normally placed a relatively constant predetermined distance apart, typical distances being twelve (12) inches, sixteen (16) or twenty four (24) inches from the centerline of one stud or joist to the centerline of the next stud or joist. Furthermore, pieces of wallboard, such as gypsum drywall wallboard, are normally fabricated to a predetermined size, typical sizes varying from four (4) or four and one half (4½) feet in width by eight (8), ten (10), twelve (12) feet, fourteen (14) and sixteen (16) in length.

In practice, variations are present in the sizes and positioning of studs or joists due to, for example, material tolerances and expansion, contraction, bending and/or warpage of the studs or joists, as well as mismeasurement and/or mislocation of the studs or joists during framing of the structure. In addition, significant dimensional variations are often present in pieces of wallboard due to manufacturing tolerances, as well as material expansion, contraction and/or warpage. Accordingly, opposing edges of the wallboard often do not align with the stud or joist as desired. Therefore, it is currently customary practice for an installer to select particular pieces of wallboard for installation in particular locations or, if the pieces of wallboard are oversize, cutting the wallboard pieces to size. This not only takes significant time, but results in additional waste or "scrap" since the entire piece of wallboard is not being utilized. Furthermore, it is customary practice to place cut edges, when possible, into corner joints and to use factory cut edges in interior joints. However, this is not always feasible and, particularly when multiple cuts are made to the wallboard pieces, situations occur when the cut edges are used in an interior wall or ceiling joint. This typically requires additional time and effort in achieving a smooth and straight cut and, even so, may result in a less than desirable match-up between adjacent wallboard pieces in an interior joint.

Accordingly, an object of the present invention is the provision of a wallboard fastening member and methods of using the same which is inexpensive to fabricate, easy to use and which facilitates the installation of wallboard in residential, commercial and industrial structures.

These and other objects of the present invention are attained by the provision of a wallboard fastening member and methods of using the same which is adapted to be positioned as a wall or ceiling stud or joist between existing studs or joists present in the walls and ceilings of residential, commercial and industrial structures. The wallboard fastening member in accordance with the present invention is intended to be used when opposing sides of a piece of wallboard, such as gypsum drywall wallboard, are not aligned with an existing stud or joist to avoid the necessity of fitting up or cutting the wallboard to size, thus saving time and reducing the extent of undesirable scrap. One preferred embodiment of a wallboard fastening member is a generally elongated member which preferably includes a flat configuration on one side and a stepped configuration on another side to permit the wallboard fastening member to fasten adjacent pieces of wallboard having the same thickness using the side having the flat configuration and adjacent pieces of wallboard having different thicknesses by using the side having a stepped configuration. In addition, if desired, wallboard fastening member can include score lines and/or perforations to permit the length of wallboard fastening member to be easily and quickly adjusted.

Other advantages and novel features of the present invention will become apparent in the following detailed description of the invention when considered in conjunction with the accompanying drawings.

DETAILED DESCRIPTION OF THE DRAWINGS

Figure 1:
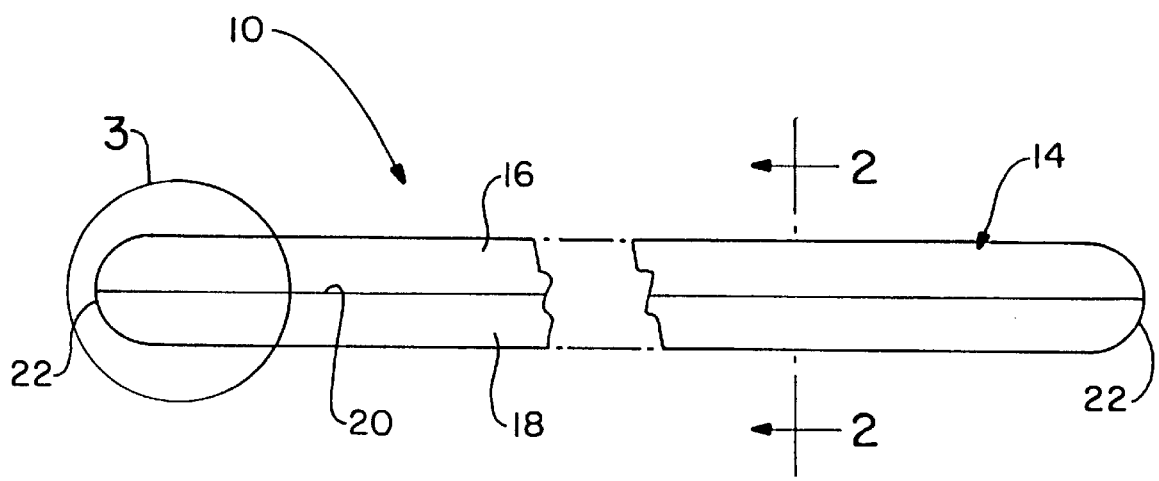
FIG. 1 illustrates a top plan view of a wallboard fastening member in accordance with a preferred embodiment of the present invention.

In the following detailed description of a preferred embodiment of the present invention, reference is made to the accompanying drawings which, in conjunction with this detailed description, illustrate and describe a preferred embodiment of a wallboard fastening member in accordance with the present invention. Referring to FIG. 1, a top plan view of a wallboard fastening member generally identified by reference number 10, in accordance with a preferred embodiment of the present invention is shown. Wallboard fastening member 10 is preferably fabricated as single integral piece and is preferably fabricated from a polymeric material, such as vinyl. In particular, a particularly preferred embodiment of wallboard fastening member 10 is fabricated from a rigid profile vinyl extrusion material manufactured by Georgia Gulf and designated as 8247 Clear 34. However, it will be readily recognized by those having ordinary skill in the relevant art that other materials may be used to fabricate wallboard fastener 10, including other polymeric materials, as well as metallic materials, such as steel and aluminum, wood, including processed wood materials, and composite materials, such as fiberglass.

Figure 2:
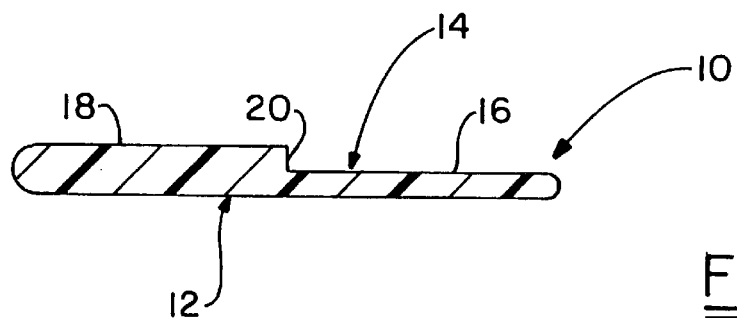
FIG. 2 illustrates a cross-sectional view of the preferred embodiment of a wallboard fastening member shown in FIG. 1 taken across line 2—2 in FIG. 1.

Referring to FIG. 2, which illustrates a cross-sectional view of the preferred embodiment of a wallboard fastening member shown in FIG. 1 taken across line 2—2 in FIG. 1, wallboard fastener member 10 includes first side 12, which is preferably substantially flat, and second side 14, which preferably has a stepped configuration including lower surface 16 and upper surface 18 separated by step 20. First side 12 is placed against the adjacent edges of wallboard pieces when utilizing wallboard fastener member 10 to fasten pieces of wallboard having the same thickness. Second side 14 is utilized when fastening pieces of wallboard having different thicknesses with lower surface 16 being placed against the edge of the piece of wallboard having the greater thickness and upper surface 18 being placed against the edge of the piece of wallboard having the lesser thickness.

Figure 3:
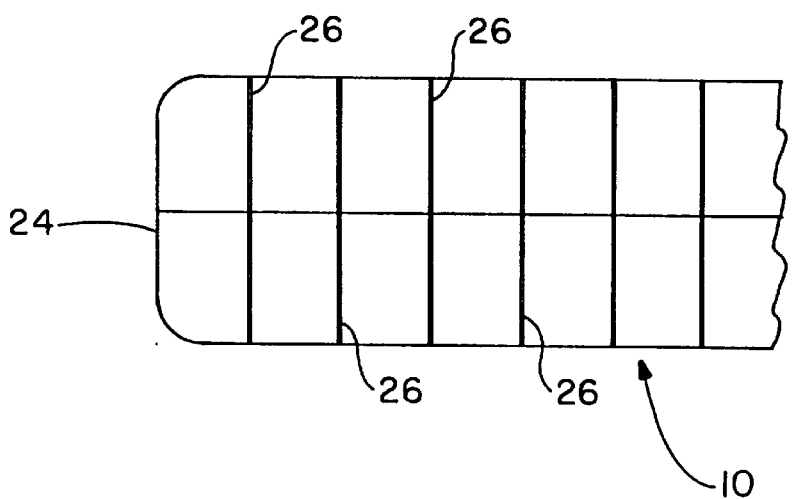
FIG. 3 is an enlarged top elevational view of the preferred embodiment of a wallboard fastening member shown in FIG. 1 taken at circle 3 in FIG. 1.

In the preferred embodiment of wallboard fastener member 10 shown in the drawings, wallboard fastener member 10 is approximately five (5) feet in length to accommodate wallboard having a width of fourth eight (48) inches and/or fifty four (54) inches and is approximately three (3) inches wide to provide sufficient space to allow adjacent pieces of wallboard to wallboard fastener member 10 to be secured thereto using screws. However, if desired, wallboard fastener member 10 could be fabricated in other lengths and widths, such as lengths of eight (8) feet, ten (10) feet, twelve (12) feet, fourteen (14) feet and/or sixteen (16) feet, to accommodate wallboard joints of these lengths. Since wallboard fastener member 10 is preferably fabricated as an single integral member, at least two (2) pieces of wallboard can be readily secured together and wallboard fastening member 10 provides sufficient strength to resist slight movement between the installed pieces of wallboard due to, for example, settling, expanding and/or contracting. The thickness between first side 12 and lower surface 16 of second side 14 is preferably approximately one eight ($1/8$) of an inch and the thickness between first side 12 and upper surface 18 of second side 14 is preferably approximately one quarter ($1/4$) of an inch. It is preferable for wallboard fastener member 10 to be relatively thin to make it manageable to transport and work with, make it easier to score and bend and snap to the appropriate length, so it takes up less space behind the wallboard pieces and minimizes interference with insulation potentially therein and reduce the amount of material needed to fabricate wallboard fastener member 10. Each end of wallboard fastening member 10 is preferably rounded 22, as shown in FIG. 1, or tapered 24, as shown in FIG. 3, to facilitate installation of wallboard fastening member 10 and reduce grabbing or catching of insulation, studs, joist and other objects. Wallboard fastening member 10 is capable of being easily scored with, for example, a razor knife, and broken or snapped along these scored lines to provide for custom fits. In addition, if desired, score marks 26, such as partial depth v-shaped grooves or spaced perforations, may be provided at predetermined intervals, such as the one (1) inch intervals present in the preferred embodiment of wallboard fastening member 10 shown in FIG. 3, to allow the end pieces of wallboard fastening member 10 to be broken or snapped along the desired score marks 26 and permit the length of wallboard fastening member 10 to be quickly and easily adjusted.

In use, wallboard fastening member 10 is laid on the backside of the adjacent edges of at least two (2) pieces of wallboard and wallboard fastening member 10 is secured thereto using screws. If the at least two (2) pieces of wallboard being fastened are the same thickness, first side 12 of wallboard fastening member 10 is placed on the backside of the adjacent edges of the at least two (2) pieces of wallboard. On the other hand, if the thickness of the at least two (2) pieces of wallboard being fastened are different, for example, if one piece of wallboard has a thickness of approximately five eights ($5/8$) of an inch and another piece of wallboard has a thickness of approximately one half ($1/2$) inch, second side 14 is placed on the backside of the adjacent edges of the at least two (2) pieces of wallboard, with lower surface 16 of second side 14 being placed against the backside of the adjacent edge of the piece of wallboard having a thickness of approximately five eights ($5/8$) of an inch and upper surface 18 of second side 14 being placed against the backside of the piece of wallboard having a thickness of approximately one half ($1/2$) inch.

Another use for wallboard fastener member 10 in accordance with the present invention is for covering the outwardly extending flange from, for example, plumbing fixtures, such as a tub, prior to installing wallboard. In addition, wallboard fastener member 10 may be placed over the top plate of a wall beneath a truss. Pieces of wallboard may then be fastened directly into wallboard fastener member 10 adjacent to each side of the top plate for approximately the first thirty (30) inches to preclude "nail popping" and "tape shear" which often occurs in this area due to relative expansion and contraction of materials resulting from temperature changes, in particular seasonal temperature changes. Furthermore, wallboard fastener member 10 can be used behind pieces of wallboard which are offset or staggered in their longitudinal direction when installed onto a wall or ceiling.

Advantages of wallboard fastening member 10 in accordance with the present invention include saving time and materials since it is generally no longer necessary to preselect or cut pieces of wallboard to a particular predetermined size. Thus, time previously spent on scaffolding and benches for premeasurements is generally no longer necessary. In addition, the amount of wallboard needed to complete a certain job is generally less since less custom fitting is needed and therefore less scrap is created. Wallboard fastening member 10 in accordance with the present invention can be used to fasten adjoining pieces of wallboard having the same thickness or different thicknesses. The occurrence of nail pops due to attaching pieces of wallboard to a truss is also generally reduced when using wallboard fastening member 10 since wallboard fastening member 10 is sufficiently flexible to accommodate relative movement between the ceiling and/or the wall due to settling, expanding and contracting. In addition, use of wallboard fastening member 10 in accordance with the present invention reduces crowning. Furthermore, an installer does not have to be as concerned with the directional layout of ceilings due to different truss positions when using wallboard fastening member 10 in accordance with the present invention.

Another use for wallboard fastener member 10 is to repair, for example, a hole in a piece of wallboard. In this situation, wallboard fastener member 10 can be inserted into the hole to be covered and secured above and below the hole using screws. This provides a backing for a piece of wallboard which is cut to correspond with the hole to be covered and allows this piece of wallboard to be attached to wallboard fastener member 10. This reduces the time needed to make a repair and provides a quality repaired wallboard surface.

Although the present invention has been described above in detail, the same is by way of illustration and example only and is not to be taken as a limitation on the present invention. For example, other modifications to and uses for wallboard fastener member 10 could be readily utilized in accordance with the teachings of the present invention. Accordingly, the scope and content of the present invention are to be defined only by the terms of the appended claims.

What is claimed is:

1. A wallboard fastener member for joining adjacent edges of at least two (2) pieces of wallboard, said wallboard fastener member comprising an elongated member having a first side and a second side and at least one transversely extending score mark, at least one of said first side and said second side being adapted for placement behind the adjacent edges of the at least two (2) pieces of wallboard and said at least one of said first side and said second side being adapted to be secured to the at least two (2) adjacent edges of wallboard, said first side of said elongated member has a substantially flat configuration and said second side of said elongated member has an offset configuration including a lower surface which is offset by a step from an upper surface.

2. The wallboard fastener member in accordance with claim 1, wherein said wallboard fastener member is fabricated from a polymeric material.

3. The wallboard fastener member in accordance with claim 1, wherein said wallboard fastener member is fabricated from a rigid profile vinyl extrusion material.

4. The wallboard fastener member in accordance with claim 1, wherein said wallboard fastener member is fabricated from a vinyl material.

5. The wallboard fastener member in accordance with claim 4, wherein said wallboard fastener member is fabricated as a single integral piece.

6. The wallboard fastener member in accordance with claim 5, wherein said wallboard fastener member is approximately five (5) feet long and approximately three (3) inches wide.

7. The wallboard fastener member in accordance with claim 6, wherein at least one end of said wallboard fastener member is rounded.

8. The wallboard fastener member in accordance with claim 6, wherein at least one end of said wallboard fastener member is tapered.

9. The wallboard fastener member in accordance with claim 6, wherein said wallboard fastener member includes a plurality of transversely extending score marks spaced apart in approximately one (1) inch intervals.

10. The wallboard fastener member in accordance with claim 9, wherein said plurality of transversely extending score marks are partial depth v-shaped grooves spaced apart in approximately one (1) inch intervals.

11. The wallboard fastener member in accordance with claim 9, wherein said plurality of transversely extending score marks are spaced perforations spaced apart in approximately one (1) inch intervals.

12. The wallboard fastener member in accordance with claim 4, wherein said first side has a substantially flat configuration and said second side has an offset configuration including a lower surface which is offset by a step from an upper surface by approximately one eighth ($\frac{1}{8}$) of an inch.

13. The wallboard fastener member in accordance with claim 12, wherein said wallboard fastener member is fabricated as a single integral piece.

14. The wallboard fastener member in accordance with claim 13, wherein said wallboard fastener member is approximately five (5) feet long and approximately three (3) inches wide.

15. The wallboard fastener member in accordance with claim 14, wherein at least one end of said wallboard fastener member is rounded.

16. The wallboard fastener member in accordance with claim 14, wherein said wallboard fastener member includes a plurality of transversely extending score marks spaced apart in approximately one (1) inch intervals.

17. The wallboard fastener member in accordance with claim 1, wherein said first side has a substantially flat configuration and said second side has an offset configuration including a lower surface which is offset by a step from an upper surface by approximately one eighth ($\frac{1}{8}$) of an inch.

18. The wallboard fastener member in accordance with claim 17, wherein said wallboard fastener member is fabricated as a single integral piece.

19. The wallboard fastener member in accordance with claim 18, wherein said wallboard fastener member is approximately five (5) feet long and approximately three (3) inches wide.

20. The wallboard fastener member in accordance with claim 19, wherein at least one end of said wallboard fastener member is rounded.

21. The wallboard fastener member in accordance with claim 9, wherein said wallboard fastener member includes a plurality of transversely extending score marks spaced apart in approximately one (1) inch intervals.

22. The wallboard fastener member in accordance with claim 1, wherein said wallboard fastener member is fabricated as a single integral piece.

23. The wallboard fastener member in accordance with claim 22, wherein said wallboard fastener member is fabricated from a polymeric material.

24. The wallboard fastener member in accordance with claim 22, wherein said wallboard fastener member is fabricated from a vinyl material.

25. The wallboard fastener member in accordance with claim 22, wherein said wallboard fastener member is fabricated from a rigid profile vinyl extrusion material.

26. The wallboard fastener member in accordance with claim 1, wherein said wallboard fastener member is approximately five (5) feet long and approximately three (3) inches wide.

27. The wallboard fastener member in accordance with claim 1, wherein at least one end of said wallboard fastener member is rounded.

28. The wallboard fastener member in accordance with claim 1, wherein at least one end of said wallboard fastener member is tapered.

29. The wallboard fastener member in accordance with claim 1, wherein said wallboard fastener member includes a plurality of transversely extending score marks spaced apart in approximately one (1) inch intervals.

30. The wallboard fastener member in accordance with claim 29, wherein said plurality of transversely extending score marks are partial depth v-shaped grooves spaced apart in approximately one (1) inch intervals.

31. The wallboard fastener member in accordance with claim 29, wherein said plurality of transversely extending score marks are spaced perforations spaced apart in approximately one (1) inch intervals.

* * * * *